United States Patent
Partin

(10) Patent No.: US 8,212,690 B1
(45) Date of Patent: Jul. 3, 2012

(54) VEHICLE DETECTION INDUCTIVE LOOP ACTIVATION DEVICE

(76) Inventor: Edwin Partin, Tulsa, OK (US)

(*) Notice: Subject to any disclaimer, the term of this patent is extended or adjusted under 35 U.S.C. 154(b) by 384 days.

(21) Appl. No.: 12/501,126

(22) Filed: Jul. 10, 2009

Related U.S. Application Data

(60) Provisional application No. 61/092,314, filed on Aug. 27, 2008.

(51) Int. Cl.
*G08G 1/01* (2006.01)

(52) U.S. Cl. .......... 340/941; 340/933; 340/938; 340/561

(58) Field of Classification Search .................. 340/941, 340/933, 938, 561; 180/65.1; 73/146, 146.5, 73/146.8; 191/2, 70; 307/10
See application file for complete search history.

(56) References Cited

U.S. PATENT DOCUMENTS

| | | | |
|---|---|---|---|
| 3,693,144 A | 9/1972 | Friedman | |
| 4,430,636 A | 2/1984 | Bruce | |
| 4,472,706 A | 9/1984 | Hodge et al. | |
| 5,057,831 A | 10/1991 | Strang et al. | |
| 5,652,577 A * | 7/1997 | Frasier | 340/933 |
| 7,021,132 B2 * | 4/2006 | Nigon et al. | 73/146.5 |
| 7,330,132 B1 * | 2/2008 | Kauffman | 340/941 |
| 7,907,065 B2 * | 3/2011 | Richley | 340/941 |

* cited by examiner

*Primary Examiner* — Toan N Pham
(74) *Attorney, Agent, or Firm* — Gable Gotwals

(57) ABSTRACT

A passive activator, used in combination with a vehicle sensing arrangement in a roadway, includes an electrically conductive material such as a wire mesh and placed inside or within a vehicle tire. The electrically conductive material portion forms a closed loop. The electrically conductive material portion may also include a protective layer or liner to prevent damage to the tire or to an inner tube of the tire. The passive activator causes sufficient disturbance of the electromagnetic field to activate a vehicle detection sensor located in a roadway when a tire equipped with the passive activator passes over the roadway induction loop.

20 Claims, 1 Drawing Sheet

VEHICLE DETECTION INDUCTIVE LOOP ACTIVATION DEVICE

CROSS-REFERENCE TO OTHER PENDING APPLICATIONS

This application claims the benefit of U.S. Provisional Application No. 61/092,314, filed on Aug. 27, 2008.

BACKGROUND OF THE INVENTION

This invention relates to the field of traffic systems using an induction loop in a roadway to detect the presence of a vehicle by sensing interactions of the vehicle with the electro-magnetic field of the loop. More specifically, this invention relates to the field of devices and methods to activate such traffic control systems by passively simulating the presence of a vehicle.

Control systems for traffic signals typically include a vehicle sensor having an inductive loop and utilizing the interaction between the electro-magnetic field of the loop and a vehicle. The prior art is replete with descriptions of such systems as represented by U.S. Pat. No. 4,430,636 to Bruce, U.S. Pat. No. 4,472,706 to Hodge et al., and U.S. Pat. No. 3,693,144 to Freidman.

The inductive loop sensors used in roadways as described in the aforementioned prior art typically include means for creating an electro-magnetic field, usually an inductive loop in the roadway (either embedded in the roadway or attached to the surface of the roadway). The inductive loop produces the electro-magnetic field, and such sensors further include means for utilizing changes in the electro-magnetic field to activate the control system. For example, when a vehicle such as a conventional automobile enters the electro-magnetic field, the inductance of the loop changes, and the sensor utilizes these changes in the inductance to sense the presence of the automobile and to activate the system.

However, many modern automobile designs utilize composite materials to the extent that such automobiles lack sufficient metallic presence to be detected by such sensors. Metallic presence as used herein refers to the combination of metallic mass and surface area necessary to activate the sensor. Also, some large vehicles, such as trucks, sit too high above the roadway to sufficiently interact with the field. Additionally, other types of vehicles such as bicycles, motorcycles and wheelchairs lack sufficient metallic presence to activate such control systems. (For convenience and clarity, all such automobiles, trucks and other vehicles are hereinafter referred to as "undetectable vehicles" because such vehicles cannot be detected by such sensors, either due to their lack of sufficient metallic presence or high ground clearance, or both. In contrast, those vehicles having sufficient metallic presence and appropriate ground clearance so as to be detected by such sensors are hereinafter referred to as "detectable vehicles.")

One attempted solution to this problem is disclosed in U.S. Pat. No. 5,057,831 to Strang et al. This approach utilizes an active electronic circuit to derive a signal from the electromagnetic field of the sensing loop, amplify it, and impress upon such field a re-radiated signal in a phase creating within the field a disturbance similar to that which would occur upon the presence of a detectable vehicle. However, the Strang simulator requires a large number of components, packaging for these components, as well as a power source, all adding to the complexity and manufacturing costs of this simulator.

Hence the need exists for an activation device that is lightweight, highly portable, inexpensive and easy to use, as well as a method to ensure detection by such sensors or otherwise undetectable vehicles to allow safe and unobstructed traffic flow.

SUMMARY OF THE INVENTION

The present invention provides a novel solution to the aforementioned problems and is lightweight, compact, of few components, inexpensive and easy to use. Briefly stated, the preferred embodiment of the present invention includes a tire liner made of electrically conductive material placed inside the vehicle's tire causing sufficient disturbance of the electromagnetic field to activate the vehicle detection sensor when the tire equipped with the conductive tire liner passes over the roadway induction loop. Preferred embodiment of the activator is completely passive, having no active circuits. Additionally, it is constructed of inexpensive materials. Hence, the preferred embodiment provides a less complex and less costly solution than the active systems found in the prior art noted above.

The present invention simulates the presence of a detectable vehicle by interacting with the electro-magnetic field of the loop to cause changes in the inductance sufficiently similar to those changes caused by a detectable vehicle so as to activate the sensor. Where such sensors are used, for example, to control traffic signals, an operator of a motorcycle, bicycle or other undetectable vehicle can use this invention to activate such traffic signals.

DETAILED DESCRIPTION

Figure 1:
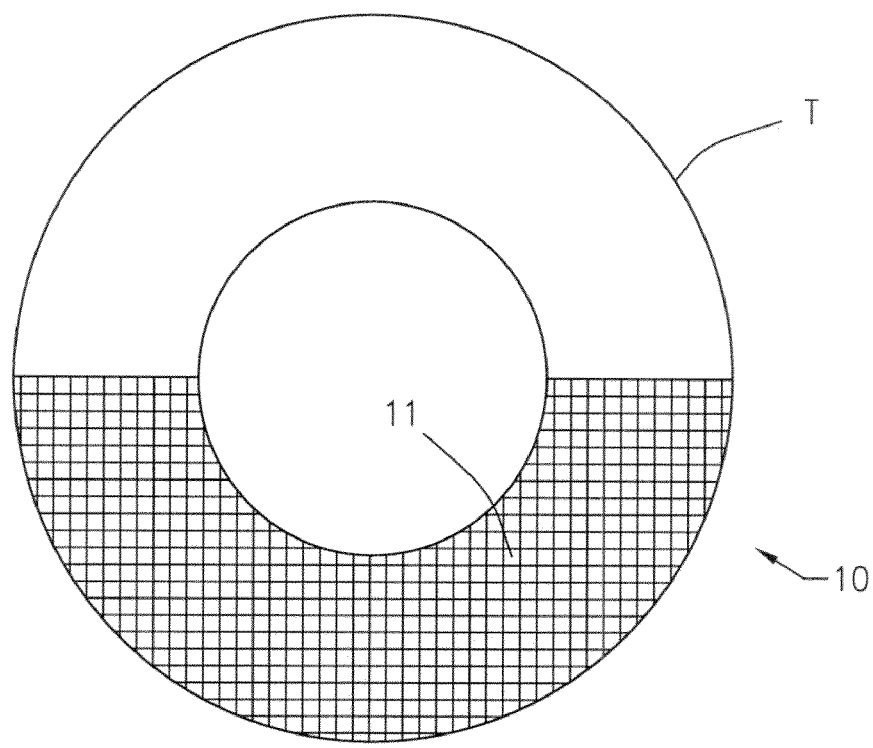
FIG. 1 illustrates a preferred embodiment of the passive activation device as installed in a rubber tire such as may be found on a bicycle or motorcycle. The device is totally concealed within the tire with no outward sign of its presence. A "cut away" view of the same tire with the electrically conductive material of the device sized to fit inside the tire covering the floor of the tire parallel to the roadway and extending up to and covering the inside of the sidewalls.
Figure 2:
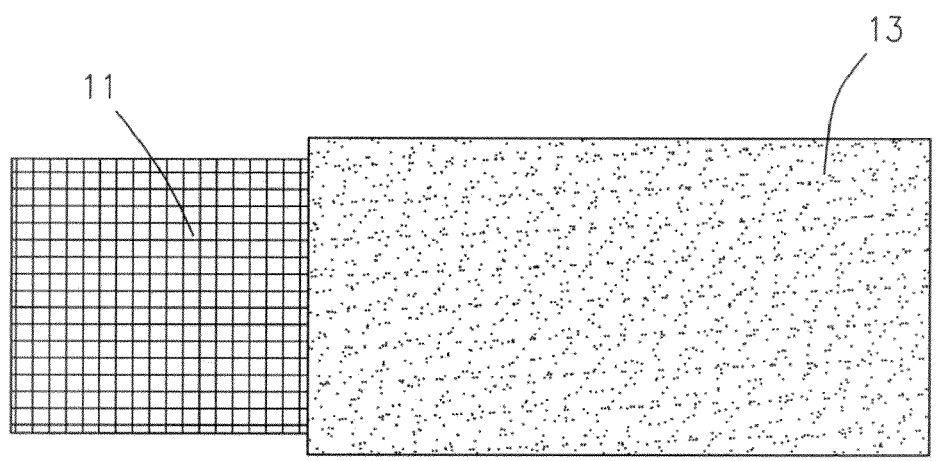
FIG. 2 is another view of the embodiment of FIG. 1 and illustrates the device prior to installation in the tire. The electrically conductive material is preferably an aluminum wire mesh. The electrically conductive material is covered by a protective layer enabling it to be placed against an inner tube without damaging the tube and allowing a solid surface to be acted against by the tire's internal air pressure (with or without a tube), thereby keeping the two ends of the conductive material pressed together to facilitate closing the circuit.

Preferred embodiments of a passive activator according to this invention will now be described by making reference to the drawings. Referring to FIGS. 1 & 2, a passive activation device 10 according to this invention passively activates an induction loop vehicle detection sensor (not shown). The vehicle detection sensor is connected to an inductive loop in a roadway that produces an electro-magnetic field and utilizes the changes caused by the interaction of a detectable vehicle with the field to activate it. The device 10 includes an electrically conductive material/liner 11 placed inside (or within) a tire T causing sufficient disturbance of the electro-magnetic field to activate the vehicle detection sensor when the tire equipped with device 10 passes over the roadway induction loop. Electrically conductive material 11, which is preferably an aluminum wire mesh and may be in the form of a liner, is sized to fit inside the tire T covering the floor of the tire T parallel to the roadway and extending up to and covering the inside of the sidewalls. Device 10 preferably includes a protective layer/liner 13 covering the electrically conductive material 11 so as to allow device 10 to be placed against an inner tube (not shown) without damaging the tube and allowing a solid surface of device 10 to be acted against by the tire's internal air pressure (with or without a tube), thereby keeping the two ends of the electrically conductive material 11 pressed together to facilitate closing the circuit.

While a passive activation device has been described with a certain degree of particularity, many changes may be made in the details of construction and the arrangement of components without departing from the spirit and scope of this disclosure. A passive activation device according to this disclosure, therefore, is limited only by the scope of the attached claims, including the full range of equivalency to which each element thereof is entitled

What is claimed is:

1. A passive activator for use by a user in combination with a vehicle sensing arrangement in a roadway, the vehicle sensing arrangement including an induction loop that produces an electro-magnetic field and a vehicle detection sensor for utilizing changes caused by an interaction of the passive activator with the electro-magnetic field to activate the vehicle sensing arrangement, the passive activator comprising:
a vehicle tire having an electrically conductive material portion forming a closed loop having no active circuits.

2. A passive activator according to claim 1 further comprising the electrically conductive portion being effective for disturbing an electro-magnetic field of a vehicle sensing arrangement in a roadway when the vehicle tire passes over the induction loop created by the vehicle sensing arrangement.

3. A passive activator according to claim 1 further comprising the electrically conductive material portion being housed within a space located between a rim of the vehicle tire and an interior surface of the vehicle tire mounted on the rim.

4. A passive activator according to claim 1 further comprising the electrically conductive material portion being in contact with a portion of the interior surface of the vehicle tire.

5. A passive activator according to claim 4 further comprising the electrically conductive material portion covering a floor portion of the vehicle tire.

6. A passive activator according to claim 4 further comprising the electrically conductive material portion covering a sidewall portion of the vehicle tire.

7. A passive activator according to claim 1 further comprising the electrically conductive material portion residing between an internal surface and an external surface of the vehicle tire.

8. A passive activator according to claim 1 further comprising a protective layer, the electrically conductive material portion being covered on at least one side by the protective layer.

9. A passive activator according to claim 1 further comprising the electrically conductive material portion being a wire mesh.

10. A passive activator according to claim 1 further comprising the electrically conductive portion being in the form of a liner for lining an interior surface of the vehicle tire.

11. A passive activator for use by a user in combination with a vehicle sensing arrangement in a roadway, the vehicle sensing arrangement including an induction loop that produces an electro-magnetic field and a vehicle detection sensor for utilizing changes caused by an interaction of the passive activator with the electro-magnetic field to activate the vehicle sensing arrangement, the passive activator comprising:
a vehicle tire having an electrically conductive material portion forming a closed loop, the electrically conductive material portion residing between a rim of the vehicle tire and an external surface of the vehicle tire and having no active circuits.

12. The passive activator according to claim 11 further comprising the electrically conductive material portion being housed within a space located between the rim of the vehicle tire and an interior surface of the vehicle tire mounted on the rim.

13. The passive activator according to claim 11 further comprising the electrically conductive material portion being in contact with a portion of the interior surface of the vehicle tire.

14. The passive activator according to claim 11 further comprising the electrically conductive material portion residing between an internal surface and the external surface of the vehicle tire.

15. The passive activator according to claim 11 further comprising a protective layer, the electrically conductive material portion being covered on at least one side by the protective layer.

16. The passive activator according to claim 11 further comprising the electrically conductive material portion being a wire mesh.

17. The passive activator according to claim 11 further comprising the electrically conductive portion being in the form of a liner for lining an interior surface of the vehicle tire.

18. A passive activator for use by a user in combination with a vehicle sensing arrangement in a roadway, the vehicle sensing arrangement including an induction loop that produces an electro-magnetic field and a vehicle detection sensor for utilizing changes caused by an interaction of the passive activator with the electro-magnetic field to activate the vehicle sensing arrangement, the passive activator comprising:
a vehicle tire having an electrically conductive material portion forming a closed loop, the electrically conductive material portion being housed within a space located between a rim of the vehicle tire and an interior surface of the vehicle tire mounted on the tire rim.

19. A passive activator for use by a user in combination with a vehicle sensing arrangement in a roadway, the vehicle sensing arrangement including an induction loop that produces an electro-magnetic field and a vehicle detection sensor for utilizing the changes caused by the interaction of the passive activator with the electro-magnetic field to activate the vehicle sensing arrangement, the passive activator comprising:
a vehicle tire having an electrically conductive material portion forming a closed loop, and
a protective layer, the electrically conductive material portion being covered on at least one side by the protective layer.

20. A passive activator for use by a user in combination with a vehicle sensing arrangement in a roadway, the vehicle sensing arrangement including an induction loop that produces an electro-magnetic field and a vehicle detection sensor for utilizing the changes caused by the interaction of the passive activator with the electro-magnetic field to activate the vehicle sensing arrangement, the passive activator comprising:
a vehicle tire having an electrically conductive material portion forming a closed loop, the electrically conductive portion being in the form of a liner for lining an interior surface of the vehicle tire.

* * * * *